(12) United States Patent
Tsujimura et al.

(10) Patent No.: US 8,791,036 B2
(45) Date of Patent: Jul. 29, 2014

(54) GLASS PLATE FOR SUBSTRATE, METHOD FOR PRODUCING SAME, AND METHOD FOR PRODUCING TFT PANEL

(75) Inventors: Tomoyuki Tsujimura, Tokyo (JP); Yuichi Kuroki, Tokyo (JP); Manabu Nishizawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 78 days.

(21) Appl. No.: 13/435,222

(22) Filed: Mar. 30, 2012

(65) Prior Publication Data

US 2012/0208309 A1  Aug. 16, 2012

Related U.S. Application Data

(63) Continuation of application No. PCT/JP2010/068410, filed on Oct. 19, 2010.

(30) Foreign Application Priority Data

Oct. 19, 2009 (JP) .................................. 2009-240204

(51) Int. Cl.
$C03C\ 3/085$ (2006.01)

(52) U.S. Cl.
USPC .......... 501/69; 501/70; 438/29; 65/90; 65/95; 65/99.1

(58) Field of Classification Search
USPC ............... 501/69, 70; 438/29; 65/90, 95, 99.1
See application file for complete search history.

(56) References Cited

U.S. PATENT DOCUMENTS

| | | | |
|---|---|---|---|
| 6,518,211 B1 * | 2/2003 | Bradshaw et al. | 501/69 |
| 8,236,717 B2 * | 8/2012 | Nishizawa et al. | 501/69 |
| 8,455,375 B2 * | 6/2013 | Nishizawa et al. | 438/800 |
| 8,518,545 B2 * | 8/2013 | Akiba et al. | 428/410 |
| 2002/0006856 A1 | 1/2002 | Harding et al. | |
| 2009/0298669 A1 * | 12/2009 | Akiba et al. | 501/70 |
| 2011/0091704 A1 * | 4/2011 | Akiba et al. | 428/220 |
| 2012/0199203 A1 * | 8/2012 | Nishizawa et al. | 136/262 |
| 2013/0093312 A1 * | 4/2013 | Ono et al. | 313/489 |

FOREIGN PATENT DOCUMENTS

| | | |
|---|---|---|
| CN | 1673140 A | 9/2005 |
| JP | 2005-162536 | 6/2005 |
| JP | 2005-213132 | 8/2005 |
| JP | 2005-324992 | 11/2005 |
| JP | 2006-137631 | 6/2006 |
| JP | 2006-169028 | 6/2006 |
| JP | 2008-056508 | 3/2008 |
| JP | 2008-305711 | 12/2008 |
| JP | 2009-084073 | 4/2009 |
| WO | WO 2009131053 A1 * | 10/2009 |
| WO | WO 2010125981 A1 * | 11/2010 |
| WO | WO 2011049100 A1 * | 4/2011 |
| WO | WO 2011049146 A1 * | 4/2011 |
| WO | WO 2011145661 A1 * | 11/2011 |
| WO | WO 2012008586 A1 * | 1/2012 |

OTHER PUBLICATIONS

International Search Report issued Jan. 18, 2011 in PCT/JP2010/068410 filed Oct. 19, 2010.

* cited by examiner

*Primary Examiner* — Kaj K Olsen
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention relates to a glass plate for a substrate contains, as a glass matrix composition, in mol % on the oxide basis, $SiO_2$: 67 to 72, $Al_2O_3$: 1 to 7, $B_2O_3$: 0 to 4, MgO: 11 to 15, CaO: 0 to 3, SrO: 0 to 3, BaO: 0 to 4, $ZrO_2$: 0 to 4, $Na_2O$: 8 to 15, and $K_2O$: 0 to 7, with $SiO_2+Al_2O_3$: 71 to 77, MgO+CaO+SrO+BaO: 11 to 17, $Na_2O+K_2O$: 8 to 17, and satisfying $K_2O/(Na_2O+K_2O) \le 0.13 \times (SiO_2+Al_2O_3+0.5B_2O_3+0.3BaO)-9.4$, in which the glass plate has a β-OH value ($mm^{-1}$) of 0.05 to 0.5, and a heat shrinkage ratio (C) of 16 ppm or less.

8 Claims, 1 Drawing Sheet

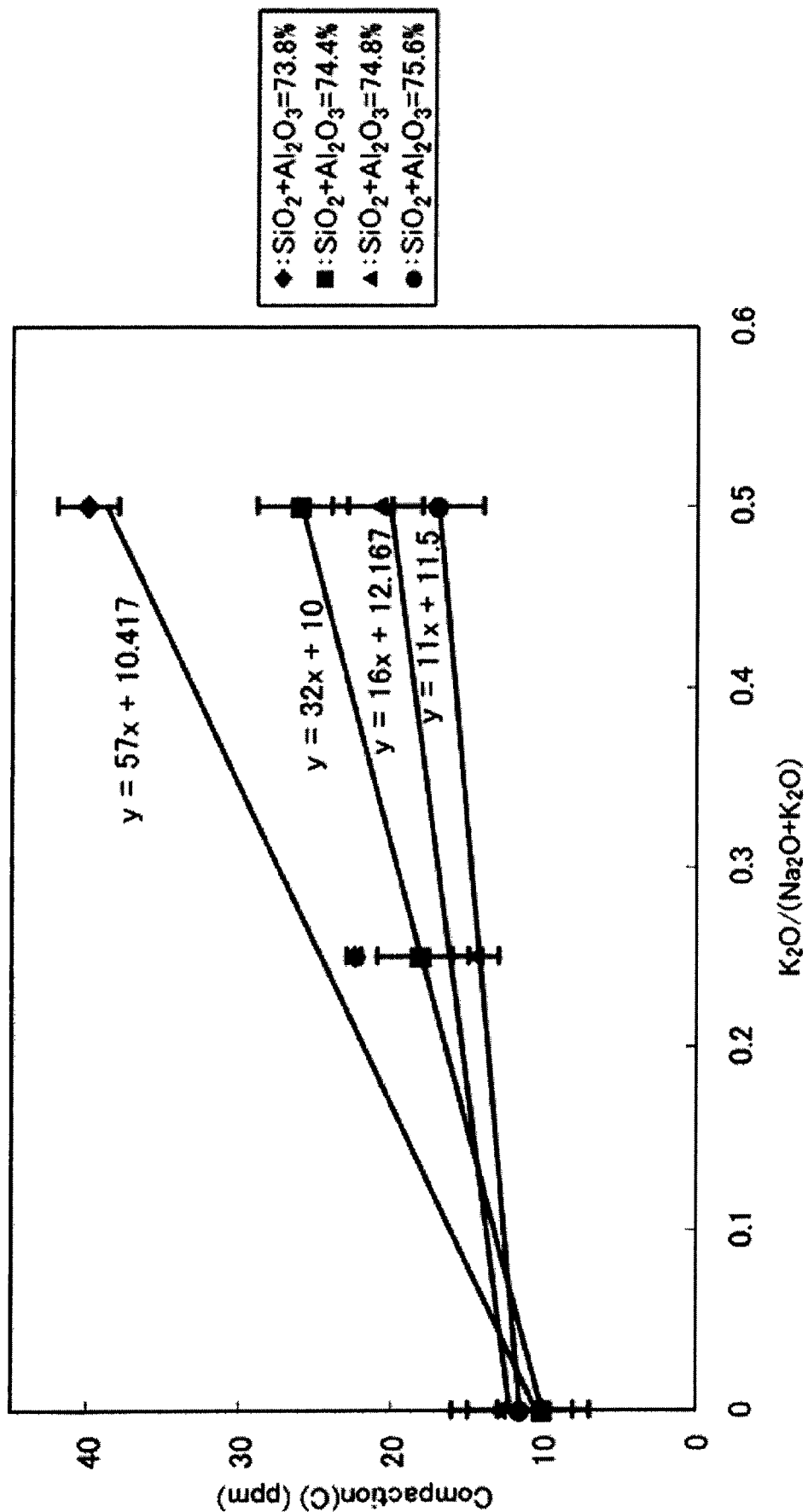

GLASS PLATE FOR SUBSTRATE, METHOD FOR PRODUCING SAME, AND METHOD FOR PRODUCING TFT PANEL

CROSS REFERENCE TO RELATED APPLICATIONS

This application is a continuation application of PCT/JP10/068,410, filed Oct. 19, 2010, the disclosure of which is incorporated herein by reference in its entirety. The parent application claims priority to Japanese Application No. 2009-240204, filed Oct. 19, 2009, the disclosure of which is incorporated herein by reference in its entirety.

TECHNICAL FIELD

The present invention relates to a glass plate for a substrate, which is used for various display panels such as liquid crystal display (LCD) panel and plasma display panel (PDP). The glass plate for a substrate of the present invention is particularly suitable as the glass plate for an LCD panel.

BACKGROUND ART

Heretofore, an alkali-free glass containing no alkali metal oxide has been used as the glass plate for an LCD panel. This is because when an alkali metal oxide is contained in the glass substrate, during a heat treatment performed in the production process of an LCD panel, an alkali ion in the glass substrate may diffuse into a semiconductor film of a thin-film transistor (TFT) used for driving an LCD panel and cause deterioration of the TFT characteristics.

Also, by virtue of having a low thermal expansion coefficient and a high glass transition temperature (Tg), the alkali-free glass is less likely to undergo a dimensional change in the production process of an LCD panel and has small effect on the displaying quality due to thermal stress during use of the LCD panel and therefore, is preferred as the glass substrate for an LCD panel.

However, the alkali-free glass has the following drawbacks in view of production.

The alkali-free glass is very highly viscous and has a property of being difficult to melt, and its production involves technical difficulty.

Furthermore, in general, a refining agent is poorly effective for an alkali-free glass. For example, in the case of using $SO_3$ as the refining agent, since the temperature at which $SO_3$ is (decomposed and) released as bubbles is lower than the glass melting temperature, the most part of $SO_3$ added is decomposed and volatilized from the molten glass before fining is achieved, and the fining effect cannot be sufficiently exerted.

Use of an alkali metal oxide-containing alkali glass substrate as the glass substrate for a TFT panel ("a-Si for TFT panel") has been also proposed (see, Patent Documents 1 and 2). This is because the heat treatment in the production process of a TFT panel becomes possible to be performed at a relatively low temperature (approximately from 250 to 300° C.), while it has been conventionally performed at 350 to 450° C.

The alkali metal oxide-containing glass generally has a high thermal expansion coefficient and therefore, in order to obtain a thermal expansion coefficient preferred as the glass substrate for a TFT panel, $B_2O_3$ having an effect of reducing the thermal expansion coefficient is usually incorporated (see, Patent Documents 1 and 2).

However, in the case where a glass composition containing $B_2O_3$ is formulated, $B_2O_3$ is volatilized upon melting of the glass particularly in a melting step, a fining step and a float forming step, and in turn, the glass composition is liable to become inhomogeneous. When the glass composition becomes inhomogeneous, this affects the flatness in forming the glass into a plate shape. In order to secure the displaying quality, high flatness is required of the glass substrate for a TFT panel so that the distance between two sheets of glass sandwiching a liquid crystal, i.e., the cell gap, can be kept constant. Therefore, after forming a sheet glass by a float process, the surface of the sheet glass is polished so as to secure a predetermined flatness, but when the sheet glass after forming does not have a predetermined flatness, the polishing step requires a long time and the productivity is reduced. Also, considering the environmental burden caused by volatilization of $B_2O_3$, lower content of $B_2O_3$ in the molten glass is preferable.

However, when the $B_2O_3$ content is low, it has been difficult to reduce the thermal expansion coefficient to a level preferred as a glass substrate for a TFT panel and achieve a predetermined Tg or the like while suppressing the increase in viscosity.

RELATED ART

Patent Document

Patent Document 1: JP-A-2006-137631
Patent Document 2: JP-A-2006-169028

SUMMARY OF THE INVENTION

Problems that the Invention is to Solve

As a result of intensive studies, the present inventors have found that the compaction (heat shrinkage ratio) of the glass in the above-described heat treatment at a low temperature can greatly affect the deposition quality (deposition pattern accuracy) on the glass substrate.

Also, in view of productivity enhancement and quality enhancement of the glass, the glass is preferably produced under the conditions where water amount in the glass becomes high (for example, burning the fuel such as city gas and heavy oil in an oxygen combustion system or an oxygen/air combustion system, or using a hydroxide as the glass raw material), but it has been found that when the glass is produced under the conditions where the water amount in the glass becomes high, the compaction of the glass produced can be hardly reduced to the desired level. As an index indicative of the water content in the glass, β-OH value ($mm^{-1}$) of the glass is used. In particular, it has been found that when the glass is produced under the conditions where the β-OH value becomes 0.2 or more, the compaction of the glass is hardly reduced to 16 ppm or less according to the conventional glass composition. Incidentally, the productivity enhancement above includes, for example, efficient melting by selecting the burning method, and the quality enhancement above includes, for example, enhancement of the defoaming property by reduced-pressure defoaming.

For solving the above problems, an object of the present invention is to provide a glass plate for a substrate, containing an alkali metal oxide, and having a small $B_2O_3$ content, a water amount in the glass of from 0.05 to 0.5 in terms of the β-OH value ($mm^{-1}$), and a small compaction during a heat treatment at a low temperature (from 150 to 300° C.) in the production process of a TFT panel (specifically, a heat treatment in the step of depositing a gate insulating film), and which can be suitably used as a glass substrate particularly for a large-size TFT panel (for example, size of 2 m or more on a side); a production method thereof; and a method for producing a TFT panel using the glass plate.

Another object of the present invention is to provide a glass plate for a substrate, ensuring that the compaction above is small even when the water amount in the glass is, in terms of the β-OH value ($mm^{-1}$), as high as from 0.2 to 0.5, furthermore, from 0.35 to 0.5; a production method thereof; and a method for producing a TFT panel using the glass plate.

Means for Solving the Problems

In order to achieve the above objects, the present invention provides a glass plate for a substrate, comprising, as a glass matrix composition, in mol % on the oxide basis,
$SiO_2$ from 67 to 72,
$Al_2O_3$ from 1 to 7,
$B_2O_3$ from 0 to 4,
MgO from 11 to 15,
CaO from 0 to 3,
SrO from 0 to 3,
BaO from 0 to 2,
$ZrO_2$ from 0 to 4,
$Na_2O$ from 8 to 15, and
$K_2O$ from 0 to 7,
wherein
$SiO_2+Al_2O_3$ is from 73 to 77,
$MgO+CaO+SrO+BaO$ is from 11 to 17,
$Na_2O+K_2O$ is from 8 to 17, and
$K_2O/(Na_2O+K_2O) \leq 0.13 \times (SiO_2+Al_2O_3) - 9.4$ is satisfied, and
wherein
the glass plate has β-OH value ($mm^{-1}$) of from 0.05 to 0.5, and
a heat shrinkage ratio (C) of 16 ppm or less.

Further, the present invention provides a glass plate for a substrate, comprising, as a glass matrix composition, in mol % on the oxide basis,
$SiO_2$ from 67 to 72,
$Al_2O_3$ from 1 to 7,
$B_2O_3$ from 0 to 4,
MgO from 11 to 15,
CaO from 0 to 3,
SrO from 0 to 3,
BaO from 0 to 4,
$ZrO_2$ from 0 to 4,
$Na_2O$ from 8 to 15, and
$K_2O$ from 0 to 7,
wherein
$SiO_2+Al_2O_3$ is from 71 to 77,
$MgO+CaO+SrO+BaO$ is from 11 to 17,
$Na_2O+K_2O$ is from 8 to 17, and
$K_2O/(Na_2O+K_2O) \leq 0.13 \times (SiO_2+Al_2O_3+0.5B_2O_3+0.3BaO) - 9.4$ is satisfied, and
wherein
the glass plate has a β-OH value ($mm^{-1}$) of from 0.05 to 0.5, and
a heat shrinkage ratio (C) is 16 ppm or less.

In the above glass plate for a substrate, it is preferred that the β-OH value ($mm^{-1}$) is from 0.2 to 0.5

Advantage of the Invention

The glass plate for a substrate of the present invention undergoes small compaction during a heat treatment at a low temperature (from 150 to 300° C.) in the production process of a TFT panel, and hardly allows distortion of the deposition pattern on the glass substrate. Accordingly, the glass plate can be suitably used as a glass substrate particularly for a large-size TFT panel, which can respond to recent reduction in the heat treatment temperature.

Since the glass plate for a substrate of the present invention has a low $B_2O_3$ content, there is little volatilization of $B_2O_3$ during the production of the glass. Therefore, the glass plate is excellent in homogeneity and flatness, and the glass plate surface after forming requires only a low degree of polishing, which leads to excellent productivity.

Further, the glass plate for a substrate of the present invention contains an alkali component and therefore, raw materials are easily melted, which can facilitate the production.

Moreover, the glass plate for a substrate of the present invention is excellent in productivity and quality of the glass, because when the 13-OH value of the glass is as high as 0.2 to 0.5, the fuel such as city gas and heavy oil can be burned in an oxygen combustion system or an oxygen/air combustion system or a hydroxide can be used as a glass raw material in place of an oxide in the production of the glass.

Furthermore, the glass plate for a substrate of the present invention is a glass suitable for temperature reduction in the heat treatment step in a TFT process, that is, a heat treatment at 150 to 300° C., and is effective in saving energy in the TFT process.

Further, the glass plate for a substrate of the present invention is suitable as a glass substrate for a TFT panel and can be used as a substrate for other displays such as plasma display panel (PDP) and inorganic electroluminescence display. For example, in the case of using as a glass plate for PDP, since the thermal expansion coefficient is small compared with the conventional glass plate for PDP, breakage of the glass in the heat treatment step can be suppressed.

Incidentally, the glass plate for a substrate of the present invention can be used for applications other than a display panel. For example, the glass plate can be also used as a glass plate for a solar cell substrate.

BRIEF DESCRIPTION OF THE DRAWINGS

FIG. 1 is a graph plotting the relationship between $K_2O/(Na_2O+K_2O)$ and compaction (C).

MODE FOR CARRYING OUT THE INVENTION

The glass plate for a substrate of the present invention is described below.

The glass plate for a substrate of the present invention comprises, as a glass matrix composition, in mol % on the oxide basis,
$SiO_2$ from 67 to 72,
$Al_2O_3$ from 1 to 7,
$B_2O_3$ from 0 to 4,
MgO from 11 to 15,
CaO from 0 to 3,
SrO from 0 to 3,
BaO from 0 to 2,
$ZrO_2$ from 0 to 4,
$Na_2O$ from 8 to 15, and
$K_2O$ from 0 to 7,
in which
$SiO_2+Al_2O_3$ is from 73 to 77,
$MgO+CaO+SrO+BaO$ is from 11 to 17, and
$Na_2O+K_2O$ is from 8 to 17, and $K_2O/(Na_2O+K_2O) \leq 0.13 \times (SiO_2+Al_2O_3)-9.4$ is satisfied, and in which the glass plate has a β-OH value (mm$^{-1}$) of from 0.05 to 0.5, and a heat shrinkage ratio (C) is 16 ppm or less.

In the glass plate for a substrate of the present invention, the β-OH value (mm$^{-1}$) is preferably from 0.2 to 0.5.

First, the β-OH value (mm$^{-1}$) of the glass is described.

In the present invention, the β-OH value (mm$^{-1}$) of the glass is employed as an index indicative of a water content in the glass. The β-OH value of the glass can be determined by measuring the absorbance of a glass sample for light at a wavelength of 2.75 to 2.95 μm and dividing its maximum value $\beta_{max}$ by the thickness (mm) of the sample.

Next, compaction is described.

The compaction is the ratio of heat shrinkage of the glass caused by relaxation of the glass structure during a heat treatment.

In the present invention, the heat shrinkage ratio (C) (compaction (C)) means a shrinkage ratio (ppm) in the distance between indentations, when the glass plate is heated to a transition temperature Tg+50° C., held for one minute and then cooled to room temperature at 50° C./min and after impressing an indentation at two points with a predetermined distance on a surface of the glass plate, the glass plate is heated to 300° C., held for one hour and then cooled to room temperature at 100° C./hour.

The compaction (C) is described more specifically.

In the present invention, the compaction (C) means the value measured by the following method.

First, a glass plate to be measured is melted at 1,600° C., and the molten glass is flowed, formed into a plate shape and then cooled. The obtained glass plate is processed by polishing to obtain a sample of 200 mm×20 mm×2.8 mm.

Next, the obtained glass plate is heated to a transition temperature Tg+50° C., held at this temperature for one minute and then cooled to room temperature at a cooling rate of 50° C./min. Thereafter, a dot-shaped indentation is impressed at two points in the longitudinal direction with a distance A (A=190 mm) on a surface of the glass plate.

Subsequently, the glass plate is heated to 300° C. at a heating rate of 100° C./hour (=1.6° C./min), held at 300° C. for one hour, and then cooled to room temperature at a cooling rate of 100° C./hour. At this time, the distance between indentations is again measured, and the distance is put as B. Based on A and B obtained in this way, the compaction (C) is calculated according to the following formula. Incidentally, A and B are measured using an optical microscope.

$$C \text{ [ppm]} = (A-B)/A \times 10^6$$

The reasons of limiting the composition of the glass plate for a substrate of the present invention to the composition above are as follows.

$SiO_2$: This is a network former of the glass, and if its content is less than 67 mol % (hereinafter, simply referred to as %), heat resistance and chemical durability of the glass may be reduced and the thermal expansion coefficient may be increased. Also, fluctuation in the compaction (C) with respect to the β-OH value of the glass may be increased and when the β-OH value (mm$^{-1}$) is from 0.2 to 0.5, it may become difficult to reduce the compaction (C) to 16 ppm or less. However, if the content exceeds 72%, the high-temperature viscosity of the glass may be increased and there may be caused a problem that melting property and fining property of the glass are impaired.

The content of $SiO_2$ is preferably from 67 to 71%, more preferably from 68 to 71%, and still more preferably from 69 to 71%.

$Al_2O_3$: This component increases the glass transition temperature, improves heat resistance and chemical durability, and raises the Young's modulus. If its content is less than 1%, the glass transition temperature lowers. Also, fluctuation in the compaction (C) with respect to the β-OH value of the glass may be increased and when the β-OH value (mm$^{-1}$) is from 0.2 to 0.5, it may become difficult to reduce the compaction (C) to 16 ppm or less. However, if the content exceeds 7%, the high-temperature viscosity of the glass may be increased, and melting property may be impaired. Further, the devitrification temperature may be raised and forming property may be impaired.

The content of $Al_2O_3$ is preferably from 2 to 6%, and more preferably from 3 to 5%.

$SiO_2$ and $Al_2O_3$ are components forming a network of the glass, and if the content as a total is less than 73%, heat resistance and chemical durability of the glass may be reduced and the thermal expansion coefficient may be increased. Also, fluctuation in the compaction (C) with respect to the β-OH value of the glass may be increased and when the β-OH value (mm$^{-1}$) is from 0.2 to 0.5, it may become difficult to reduce the compaction (C) to 16 ppm or less. However, if the content exceeds 77%, the high-temperature viscosity of the glass may be increased and there may be caused a problem that melting property and fining property of the glass are impaired.

The content as the total of $SiO_2$ and $Al_2O_3$ is preferably from 73 to 76%, and more preferably from 73.5 to 76%.

Incidentally, in the case of the composition taking the later-described effects of $B_2O_3$ and BaO into consideration, if the content as the total of $SiO_2$ and $Al_2O_3$ is less than 71%, heat resistance and chemical durability of the glass may be reduced and the thermal expansion coefficient may be increased. In the case of the composition taking the later-described effects of $B_2O_3$ and BaO into consideration, the content as the total of $SiO_2$ and $Al_2O_3$ is preferably from 73 to 77%, more preferably from 73 to 76%, and still more preferably from 73.5 to 76%.

$B_2O_3$: In the glass plate for a substrate of the present invention, the $B_2O_3$ content is as low as 4% or less. Therefore, at the time of melting the glass in the production of the glass plate, the amount of $B_2O_3$ volatilized in the melting step, the fining step and the forming step, particularly in the melting step and the fining step is small, and the produced glass plate is excellent in homogeneity and flatness. As a result, in use as a glass plate for a TFT panel requiring high flatness, the polishing amount of the glass plate can be reduced as compared with the conventional glass plate for a substrate.

Also, considering the environmental burden caused by volatilization of $B_2O_3$, the content of $B_2O_3$ is preferably lower.

On the other hand, an effect of improving fining property of the glass can be expected by incorporating $B_2O_3$ in an amount of 2% or more.

In the case of expecting the effect of improving fining property, the content of $B_2O_3$ is preferably from 1 to 4%, more preferably from 2 to 4%, and still more preferably from 2.5 to 4%.

As in the case of adding other refining agents, when the effect of improving fining property by the addition of $B_2O_3$ is not expected, the content of $B_2O_3$ is preferably from 0 to 2%, more preferably from 0 to 1%, and it is still more preferred to substantially not contain this component.

The expression "substantially not contain" as used in the present invention means to not contain the component except of unavoidable impurities mingled from the raw material or the like, that is, not intentionally mix the component.

MgO: This component is contained because it has effects of decreasing the viscosity at the melting of the glass and accelerating the melting. If its content is less than 11%, the high-temperature viscosity of the glass may be increased and melting property may be impaired. On the other hand, if the content exceeds 15%, the thermal expansion coefficient and compaction (C) may be increased.

The content of MgO is preferably from 11.5 to 15%, and more preferably from 12 to 15%.

CaO: This component can be contained because it has effects of decreasing the viscosity at the melting of the glass and accelerating the melting. However, if its content exceeds 3%, the thermal expansion coefficient and compaction (C) of the glass may be increased.

The content of CaO is preferably from 0 to 2%, more preferably from 0 to 1%, and it is still more preferred to substantially not contain the component. Hereinafter, in the present description, 0% indicates that the relevant material is substantially not contained, that is, the material is not intentionally mixed except for impurities.

SrO: This component can be contained because it has effects of decreasing the viscosity at the melting of the glass and accelerating the melting. However, if its content exceeds 3%, the thermal expansion coefficient and compaction (C) of the glass plate may be increased.

The content of SrO is preferably from 0 to 1%, more preferably from 0 to 0.5%, and it is still more preferred to substantially not contain the component.

BaO: This component can be contained because it has effects of decreasing the viscosity at the melting of the glass and accelerating the melting. However, if its content exceeds 2%, the thermal expansion coefficient and compaction (C) of the glass plate may be increased.

The content of BaO is preferably from 0 to 1%, more preferably from 0 to 0.5%, and it is still more preferred to substantially not contain the component.

Incidentally, in the case of the composition taking the later-described effects of $B_2O_3$ and BaO into consideration, if the content of BaO exceeds 4%, the thermal expansion coefficient and compaction (C) of the glass plate may be increased. In the case of the composition taking the later-described effects of $B_2O_3$ and BaO into consideration, the content of BaO is preferably from 0 to 2%, more preferably from 0 to 1%, still more preferably from 0 to 0.5%, and it is yet still more preferred to substantially not contain this component.

MgO, CaO, SrO and BaO are contained in a total amount of 11% or more, for the purpose of decreasing the viscosity at the glass melting temperature and facilitating the melting. However, if the total amount exceeds 17%, the thermal expansion coefficient and compaction (C) of the glass may be increased.

The content as the total of MgO, CaO, SrO and BaO is preferably from 11 to 15%, more preferably from 11.5 to 15%, and still more preferably from 12 to 15%.

$Na_2O$: This component is contained in an amount of 8% or more, because it has effects of decreasing the viscosity at the glass melting temperature and facilitating the melting. However, if its content exceeds 15%, the thermal expansion coefficient may be increased.

The content of $Na_2O$ is preferably from 8 to 14%, more preferably from 8 to 13%, and still more preferably from 9 to 11%.

$K_2O$: This component is contained in an amount of 0 to 7%, because it has the same effect as that of $Na_2O$. However, if its content exceeds 7%, the thermal expansion coefficient may be increased.

The content of $K_2O$ is preferably from 0 to 5%, more preferably from 0 to 3%, and still more preferably from 0 to 2%.

$Na_2O$ and $K_2O$: These components are contained in an amount of 8% or more as the total of $Na_2O$ and $K_2O$, for the purpose of sufficiently decreasing the viscosity at the glass melting temperature. However, if the content as the total exceeds 17%, the thermal expansion coefficient may be increased.

The content as the total of $Na_2O$ and $K_2O$ is preferably from 9 to 16%, more preferably from 9.5 to 14%, and still more preferably from 10 to 13.5%.

$ZrO_2$: This component can be contained in an amount of up to 4%, because it has an effect of improving the fining property of the glass at the production of the glass. However, if its content exceeds 4%, the density becomes large. Considering reduction in the compaction (C) of the glass, the content is preferably 2% or less.

In the case of expecting the effect of improving fining property, the content of $ZrO_2$ is preferably from 2 to 4%, more preferably from 2.5 to 4%, and still more preferably from 3 to 4%.

In addition to such a configuration that individual components in the matrix composition have these above contents, the glass plate for a substrate of the present invention preferably has a composition satisfying the following formula (1).

$$K_2O/(Na_2O+K_2O) \leq 0.13 \times (SiO_2+Al_2O_3)-9.4 \quad (1)$$

The present inventors have examined the compaction of the glass by producing glasses under the condition giving a β-OH value ($mm^{-1}$) of 0.2 or more while varying individual components in the glass matrix composition. FIG. 1 is a graph plotting the relationship between the ratio of $K_2O$ occupying the alkali metal oxides in the glass ($K_2O/Na_2O+K_2O$) and the compaction (C) of the glass, for glasses differing in the total amount of $SiO_2$ and $Al_2O_3$. Here, the amounts of $SiO_2$, $Al_2O_3$, $Na_2O$ and $K_2O$ are an amount in terms of mol %.

As apparent from this graph, the present inventors have found that as the ratio of $K_2O$ occupying the alkali metal oxides in the glass is larger, the compaction (C) of the glass is increased, but in the case of glass where the total amount of $SiO_2$ and $Al_2O_3$ constituting the network of the glass is large, the increase in the compaction (C) is slowed down. As a result of intensive investigations based on this knowledge, it has been found that even in the glass having a β-OH value ($mm^{-1}$) of 0.2 to 0.5, the compaction (C) can be reduced to 16 ppm or less by formulating the composition to satisfy the above formula (1). That is, the above formula (1) is empirically derived from the relationship between $K_2O/(Na_2O+K_2O)$ and $SiO_2+Al_2O_3$ in the glass where the compaction (C) is 16 ppm or less.

Incidentally, the prevent inventors have gained knowledge that $B_2O_3$ and BaO in the glass can also affect the compaction (C) of the glass.

In the case of taking the effects of $B_2O_3$ and BaO into account, a composition satisfying the following formula (2) in place of the above formula (1) may be formulated.

$$K_2O/(Na_2O+K_2O) \leq 0.13 \times (SiO_2+Al_2O_3+0.5B_2O_3+0.3BaO)-9.4 \quad (2)$$

$B_2O_3$ is a network constituting component like $SiO_2$ and $Al_2O_3$ and, similarly to these components, is expected to have an effect of reducing fluctuation in the compaction (C) with respect to the β-OH value of the glass. However, the coordination number of $B_2O_3$ is 3 and small compared with the coordination number of 4 of $SiO_2$ and $Al_2O_3$ and therefore, the contribution ratio of $B_2O_3$ is considered to be lower than that of those components. Because of this, the contributory portion of $B_2O_3$ is set to 0.5.

BaO is a component having a large ion radius and thus being hardly movable as compared with other alkaline earth metal oxides such as MaO, CaO and SrO, and therefore, this component is estimated to less contribute to the structural relaxation at the heat treatment. However, this is considered to be a movable component compared with $SiO_2$ and $Al_2O_3$, and therefore, the contributory portion of BaO is set to 0.3.

In this connection, even a composition satisfying the above formula (2) preferably satisfies the above formula (1).

The glass plate for a substrate of the present invention may contain other components in addition to the matrix composition above as long as the glass substrate is not adversely affected. Specifically, in order to improve melting property and fining property of the glass, $SO_3$, F, Cl, $SnO_2$ and the like may be added to the matrix composition raw material so as to contain these raw materials in a total amount of 2 mol % or less in the glass.

Also, $Y_2O_3$, $La_2O_3$, $TiO_2$, $SnO_2$ and the like may be contained in a total amount of 5 mol % or less in the glass so as to enhance chemical durability of the glass or increase the Young's modulus of the glass.

Furthermore, a colorant such as $Fe_2O_3$ and $CeO_2$ may be contained in the glass so as to adjust the color tone of the glass. The content as the total of these colorants is preferably 1 mol % or less.

In addition, it is preferred that the glass plate for a substrate of the present invention substantially does not contain $As_2O_3$ and $Sb_2O_3$ in view of environmental burden and substantially does not contain ZnO in view of stable float forming.

The compaction (C) of the glass plate for a substrate of the present invention is 16 ppm or less, preferably 10 ppm or less, and more preferably 8 ppm or less.

The glass plate is suitable as a glass substrate for a TFT panel and can be used as a substrate for other displays such as plasma display panel (PDP) and inorganic electroluminescence display.

Incidentally, the glass plate can be also used for applications other than a display panel. For example, the glass plate can be also used as a glass plate for a solar cell substrate.

Since the glass plate for a substrate of the present invention has a low density of 2.50 g/cm³ or less, and even 2.48 g/cm³ or less, this is advantageous in view of weight saving or reduction in breakage during transportation.

In the glass plate for a substrate of the present invention, the density is preferably 2.46 g/cm³ or less, and more preferably 2.45 g/cm³ or less.

The glass plate for a substrate of the present invention preferably has an average thermal expansion coefficient at 50 to 350° C. of $85 \times 10^{-7}$/° C. or less, and more preferably $83 \times 10^{-7}$/° C. or less. The reason is that this is preferred in view of displaying quality, because the glass plate is less likely to undergo a dimensional change in the production process of a panel and exert an effect on the displaying quality due to thermal stress during use of the panel.

The average thermal expansion coefficient is more preferably $80 \times 10^{-7}$/° C. or less, still more preferably $75 \times 10^{-7}$/° C. or less, and yet still more preferably $70 \times 10^{-7}$/° C. or less, and is preferably $60 \times 10^{-7}$/° C. or more.

The glass plate for a substrate of the present invention preferably has a glass transition point (Tg) of 560° C. or more, and more preferably 575° C. or more.

The glass plate for a substrate of the present invention preferably has a temperature $T_2$ at which the viscosity of the glass becomes $10^2$ dPa·s of 1,700° C. or less, and more preferably 1,680° C. or less.

The glass plate for a substrate of the present invention preferably has a temperature $T_4$ at which the viscosity of the glass becomes $10^4$ dPa·s of 1,250° C. or less, and more preferably 1,220° C. or less.

Incidentally, the tolerance for the dimensional change of the substrate in the heat-treatment step performed at the production of a TFT panel varies depending on the mother glass size of the TFT panel and therefore, the average thermal expansion coefficient of the glass plate for a substrate can be appropriately selected according to the mother glass size (for example, 2 m or more on a side) of the TFT panel.

The method for producing a glass plate for a substrate of the present invention is described below.

In producing the glass plate for a substrate of the present invention, a melting/fining step and a forming step are performed in the same manner as in the production of the conventional glass plate for a substrate. Incidentally, since the glass plate for a substrate of the present invention is an alkali glass substrate containing an alkali metal oxide ($Na_2O$, $K_2O$), $SO_3$ can be effectively used as a refining agent, and a float process is suitable as a forming method.

In the process of producing the glass plate for a substrate, the method employed for forming glass into a plate shape is preferably a float process capable of easily and stably forming a large-area glass plate in line with the recent increasing size of a liquid crystal television or the like.

A preferred embodiment of the method for producing a glass plate for a substrate of the present invention is described below.

First, molten glass obtained by melting raw materials is formed into a plate shape. For example, raw materials are prepared to give a composition of the glass plate intended to be obtained, and the raw materials are continuously charged into a melting furnace and heated to approximately from 1,450 to 1,650° C. to obtain the molten glass.

Here, the β-OH value ($mm^{-1}$) of the produced glass plate for a substrate is dominated by the water amount in the raw materials, the water vapor concentration in the melting tank, and the residence time of the molten glass in the melting tank, and for the purpose of productivity enhancement and quality enhancement of the glass, it is preferred to employ a method using hydroxides as the glass raw materials in place of oxides (for example, as a magnesium source, magnesium hydroxide ($Mg(OH)_2$) is used in place of magnesium oxide (MgO)). Also, because the fuel such as city gas and heavy oil is burned in an oxygen combustion system or an oxygen/air combustion system, the water amount in the molten glass becomes, in terms of the β-OH value ($mm^{-1}$), from 0.05 to 0.5, and preferably from 0.2 to 0.5.

The molten glass is then formed into a ribbon-shaped glass plate, for example, by applying a float process.

Subsequently, the ribbon-shaped glass plate is withdrawn from the float forming furnace, cooled to a room temperature state by a cooling means and cut to obtain a glass plate for a substrate. Here, when a surface temperature of the ribbon-shaped glass plate withdrawn from the float forming furnace is set $T_H$ (° C.), the room temperature is set $T_L$ (° C.), and a time required for the surface temperature of the ribbon-shaped glass plate to be cooled to $T_L$ from $T_H$ is set t (min), the cooling means is a cooling means having an average cooling rate represented by $(T_H-T_L)/t$ of 10 to 300° C./min. The specific cooling means is not particularly limited, and a conventionally known cooling method may be employed.

Examples thereof include a method using a heating furnace having a temperature gradient.

$T_H$ is the glass transition temperature Tg+20° C., specifically, preferably from 540 to 730° C.

The average cooling rate is preferably from 15 to 150° C./min, more preferably from 20 to 80° C./min, and still more preferably from 40 to 60° C./min. By this production method of a glass plate, a glass plate having a compaction (C) of 16 ppm or less can be easily obtained.

The method for producing a TFT panel, comprising a film deposition step of depositing a gate insulating film of an array substrate on a surface of the glass plate for a substrate of the present invention, is described below.

The method for producing a TFT panel of the present invention is not particularly limited as long as it comprises a film deposition step of heating the film deposition region on a surface of the glass plate for a substrate of the present invention to a temperature (hereinafter, referred to as a film deposition temperature) within the range of 150 to 300° C., and holding the glass plate at the film deposition temperature for 5 to 60 minutes to deposit the array substrate gate insulating film in the film deposition region. The film deposition temperature is preferably from 150 to 250° C., more preferably from 150 to 230° C., and still more preferably from 150 to 200° C. Also, the time for which the glass plate is held at the film deposition temperature is preferably from 5 to 30 minutes, more preferably from 5 to 20 minutes, and still more preferably from 5 to 15 minutes.

The deposition of the gate insulating film is performed within the range of the above-described film deposition temperature and holding time and therefore, the glass plate undergoes heat shrinkage during the deposition. Incidentally, once the glass plate undergoes heat shrinkage, the result of heat shrinkage is not significantly affected by the subsequent cooling conditions (such as cooling rate). Since the glass for a substrate of the present invention has as a low compaction (C) as 16 ppm or less, heat shrinkage of the glass plate is small and distortion of the deposition pattern hardly occurs.

The deposition in the film deposition step can be achieved, for example, by a conventionally known CVD method.

In the method for producing a TFT panel of the present invention, an array substrate can be obtained by a known method, and using this array substrate, a TFT panel can be produced by the following known process.

That is, a TFT panel can be produced through a series of steps comprising an alignment treatment step of forming an alignment film on each of the array substrate and a color filter substrate and performing rubbing, a lamination step of laminating together the TFT array substrate and the color filter substrate with high accuracy while keeping a predetermined gap therebetween, a dividing step of dividing the substrate into cells with a predetermined size, an injection step of injecting a liquid crystal into the divided cell, and a polarizing plate lamination step of laminating a polarizing plate to the cell.

Examples

The present invention is described in greater detail below by referring to Inventive Examples and Production Examples, but the present invention is not limited to these Inventive Examples and Production Examples.

Inventive Examples (Examples 1 to 24 and 30 to 35) and Comparative Examples (Examples 25 to 29) of the glass plate for a substrate of the present invention are described.

Raw materials for respective components were blended to give the composition indicated by mol % in Tables 1 to 6, and after adding sulfate salt in an amount of 0.1 parts by mass in terms of $SO_3$ per 100 parts by mass of the composition, the resulting mixture was heated by using a platinum crucible at a temperature of 1,600° C. for 3 hours and melted. At the melting, a platinum stirrer was inserted, and stirring was performed for one hour to homogenize the glass. Here, the glass was melted while adjusting the β-OH value ($mm^{-1}$) of the glass plate to be produced by a water vapor atmosphere (dew point: 80° C.).

Subsequently, the molten glass was flowed, formed into a plate shape and then cooled.

The thus-obtained glass was measured for density; average thermal expansion coefficient (unit: $\times 10^{-7}/°$ C.); transition temperature Tg (unit: ° C.); temperature $T_2$ (unit: ° C.) at which the viscosity of the glass becomes $10^2$ dPa·s, which is a reference temperature of melting; temperature $T_4$ (unit: ° C.) at which the viscosity of the glass becomes $10^4$ dPa·s, which is a reference temperature of forming; compaction (C); and β-OH value, and the results are shown in Tables 1 to 6. The methods for measuring respective physical properties are shown below.

Density:

This was measured on about 20 g of a glass block containing no bubble by the Archimedes' method.

Average Thermal Expansion Coefficient at 50 to 350° C.:

This was measured using a differential thermal dilatometer (TMA) and determined in accordance with JIS R3102 (1995).

Tg:

Tg is a value measured using TMA and determined in accordance with JIS R3103-3 (2001).

Viscosity:

The viscosity was measured using a rotational viscometer, and the temperature $T_2$ at which the viscosity becomes $10^2$ dPa·s and the temperature $T_4$ at which the viscosity becomes $10^4$ dPa·s were measured.

Compaction (C):

This was measured by the above-described method for measuring the compaction (C).

β-OH Value:

This was determined by measuring the absorbance for light at a wavelength of 2.75 to 2.95 μm and dividing its maximum value $β_{max}$ by the thickness of the sample.

In the Tables, the value in the parenthesis is a value determined by calculation.

The residual amount of $SO_3$ in the glasses was from 100 to 500 ppm.

Tables 1 and 3 show Examples where the β-OH value is from 0.05 to less than 0.2; Table 2 shows Examples where with respect to the compositions of Examples in Table 1, the β-OH value is from 0.2 to 0.5; Table 4 shows Examples where with respect to the compositions of Examples in Table 3, the β-OH value is from 0.2 to 0.5; Table 5 shows Comparative Examples; and Table 6 shows Examples where the β-OH value is from 0.2 to 0.5.

TABLE 1

|  | Ex. 1 | Ex. 2 | Ex. 3 | Ex. 4 | Ex. 5 | Ex. 6 |
| --- | --- | --- | --- | --- | --- | --- |
| $SiO_2$ | 70.5 | 69.0 | 68.7 | 69.6 | 69.6 | 70.0 |
| $Al_2O_3$ | 3.2 | 5.3 | 5.0 | 5.0 | 5.2 | 5.2 |
| $B_2O_3$ | 0.0 | 0.0 | 2.5 | 0.0 | 0.0 | 0.0 |
| MgO | 12.9 | 12.6 | 11.1 | 11.2 | 12.2 | 11.8 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 1.4 | 0.0 | 0.0 |
| $Na_2O$ | 13.4 | 13.1 | 12.7 | 12.8 | 13.0 | 13.0 |
| $K_2O$ | 0.0 | 0.0 | 0.0 | 0.0 | 0.0 | 0.0 |
| $Si_2O + Al_2O_3$ | 73.7 | 74.3 | 73.7 | 74.6 | 74.8 | 75.2 |
| $Na_2O + K_2O$ | 13.4 | 13.1 | 12.7 | 12.8 | 13.0 | 13.0 |
| MgO + CaO + SrO + BaO | 12.9 | 12.6 | 11.1 | 11.2 | 12.2 | 11.8 |
| $K_2O/(Na_2O + K_2O)$ | 0.00 | 0.00 | 0.00 | 0.00 | 0.00 | 0.00 |
| $0.13(Si_2O + Al_2O_3) - 9.4$ | 0.181 | 0.259 | 0.181 | 0.298 | 0.324 | 0.376 |
| $0.13(Si_2O + Al_2O_3 + 0.5B_2O_3 + 0.3BaO) - 9.4$ | 0.181 | 0.259 | 0.345 | 0.298 | 0.324 | 0.376 |
| Average thermal expansion coefficient [×10$^{-7}$/° C.] | 79 | 76 | (76) 77 | (77) 76 | (79) 76 | (79) 77 |
| Tg [° C.] | 581 | 608 | (613) 580 | (631) 604 | (619) 618 | (620) 623 |
| Density [g/cm$^3$] | 2.43 | 2.44 | (2.39) | (2.44) | (2.41) | (2.40) |
| $T_2$ [° C.] | (1618) 1597 | (1647) | (1638) 1608 | (1668) | (1659) | (1666) |
| $T_4$ [° C.] | (1161) 1149 | (1189) | (1167) 1152 | (1213) | (1194) | (1199) |
| β-OH Value [mm$^{-1}$] | 0.18 | 0.18 | 0.18 | 0.18 | 0.18 | 0.18 |
| Compaction (C) [ppm] | (9) | (6) | (8) | (3) | (11) | (9) |

TABLE 2

|  | Ex. 7 | Ex. 8 | Ex. 9 | Ex. 10 | Ex. 11 | Ex. 12 |
| --- | --- | --- | --- | --- | --- | --- |
| $SiO_2$ | 70.5 | 69.0 | 68.7 | 69.6 | 69.6 | 70.0 |
| $Al_2O_3$ | 3.2 | 5.3 | 5.0 | 5.0 | 5.2 | 5.2 |
| $B_2O_3$ | 0.0 | 0.0 | 2.5 | 0.0 | 0.0 | 0.0 |
| MgO | 12.9 | 12.6 | 11.1 | 11.2 | 12.2 | 11.8 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 1.4 | 0.0 | 0.0 |
| $Na_2O$ | 13.4 | 13.1 | 12.7 | 12.8 | 13.0 | 13.0 |
| $K_2O$ | 0.0 | 0.0 | 0.0 | 0.0 | 0.0 | 0.0 |
| $Si_2O + Al_2O_3$ | 73.7 | 74.3 | 73.7 | 74.6 | 74.8 | 75.2 |
| $Na_2O + K_2O$ | 13.4 | 13.1 | 12.7 | 12.8 | 13.0 | 13.0 |
| MgO + CaO + SrO + BaO | 12.9 | 12.6 | 11.1 | 11.2 | 12.2 | 11.8 |
| $K_2O/(Na_2O + K_2O)$ | 0.00 | 0.00 | 0.00 | 0.00 | 0.00 | 0.00 |
| $0.13(Si_2O + Al_2O_3) - 9.4$ | 0.181 | 0.259 | 0.181 | 0.298 | 0.324 | 0.376 |
| $0.13(Si_2O + Al_2O_3 + 0.5B_2O_3 + 0.3BaO) - 9.4$ | 0.181 | 0.259 | 0.345 | 0.298 | 0.324 | 0.376 |
| Average thermal expansion coefficient [×10$^{-7}$/° C.] | 79 | 76 | (76) 77 | (77) 76 | (79) 76 | (79) 77 |
| Tg [° C.] | 581 | 608 | (613) 580 | (631) 604 | (619) 618 | (620) 623 |
| Density [g/cm$^3$] | 2.43 | 2.44 | (2.39) | (2.44) | (2.41) | (2.40) |
| $T_2$ [° C.] | (1618) 1597 | (1647) | (1638) 1608 | (1668) | (1659) | (1666) |
| $T_4$ [° C.] | (1161) 1149 | (1189) | (1167) 1152 | (1213) | (1194) | (1199) |
| β-OH Value [mm$^{-1}$] | 0.39 | 0.38 | 0.38 | 0.38 | 0.39 | 0.40 |
| Compaction (C) [ppm] | 12 | 8 | 11 | 4 | 15 | 13 |

TABLE 3

|  | Ex. 13 | Ex. 14 | Ex. 15 | Ex. 16 | Ex. 17 | Ex. 18 |
| --- | --- | --- | --- | --- | --- | --- |
| $SiO_2$ | 69.0 | 69.5 | 70.6 | 69.0 | 70.5 | 69.0 |
| $Al_2O_3$ | 5.3 | 5.2 | 3.2 | 5.3 | 3.2 | 5.3 |
| $B_2O_3$ | 0.0 | 0.0 | 0.0 | 0.0 | 0.0 | 0.0 |

TABLE 3-continued

|  | Ex. 13 | Ex. 14 | Ex. 15 | Ex. 16 | Ex. 17 | Ex. 18 |
|---|---|---|---|---|---|---|
| MgO | 12.6 | 12.2 | 12.9 | 12.6 | 14.9 | 14.6 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 0.0 | 0.0 | 0.0 |
| $Na_2O$ | 9.8 | 9.8 | 12.0 | 11.1 | 10.0 | 9.4 |
| $K_2O$ | 3.3 | 3.3 | 1.3 | 2.0 | 1.4 | 1.7 |
| $Si_2O + Al_2O_3$ | 74.3 | 74.7 | 73.8 | 74.3 | 73.7 | 74.3 |
| $Na_2O + K_2O$ | 13.1 | 13.1 | 13.3 | 13.1 | 11.4 | 11.1 |
| MgO + CaO + SrO + BaO | 12.6 | 12.2 | 12.9 | 12.6 | 14.9 | 14.6 |
| $K_2O/(Na_2O + K_2O)$ | 0.25 | 0.25 | 0.10 | 0.15 | 0.12 | 0.15 |
| $0.13(Si_2O + Al_2O_3) - 9.4$ | 0.259 | 0.311 | 0.194 | 0.259 | 0.181 | 0.259 |
| $0.13(Si_2O + Al_2O_3 + 0.5B_2O_3 + 0.3BaO) - 9.4$ | 0.259 | 0.311 | 0.194 | 0.259 | 0.181 | 0.259 |
| Average thermal expansion coefficient [×$10^{-7}$/° C.] | (82) 84 | (82) 84 | (82) 82 | (82) 82 | 74 | (75) 74 |
| Tg [° C.] | (628) 602 | (628) 605 | (608) 577 | (624) 596 | 604 | (637) 630 |
| Density [g/cm$^3$] | (2.40) | (2.39) | (2.40) | (2.40) | 2.46 | (2.41) |
| $T_2$ [° C.] | (1679) 1655 | (1688) | (1631) 1601 | (1666) | 1629 | (1674) |
| $T_4$ [° C.] | (1218) 1208 | (1222) | (1173) 1137 | (1206) | 1188 | (1221) |
| β-OH Value [mm$^{-1}$] | 0.18 | 0.18 | 0.18 | 0.18 | 0.18 | 0.18 |
| Compaction (C) [ppm] | (11) | (9) | (11) | (12) | (11) | (12) |

TABLE 4

|  | Ex. 19 | Ex. 20 | Ex. 21 | Ex. 22 | Ex. 23 | Ex. 24 |
|---|---|---|---|---|---|---|
| $SiO_2$ | 69.0 | 69.5 | 70.6 | 69.0 | 70.5 | 69.0 |
| $Al_2O_3$ | 5.3 | 5.2 | 3.2 | 5.3 | 3.2 | 5.3 |
| $B_2O_3$ | 0.0 | 0.0 | 0.0 | 0.0 | 0.0 | 0.0 |
| MgO | 12.6 | 12.2 | 12.9 | 12.6 | 14.9 | 14.6 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| $ZrO_2$ | 0.0 | 0.0 | 0.0 | 0.0 | 0.0 | 0.0 |
| $Na_2O$ | 9.8 | 9.8 | 12.0 | 11.1 | 10.0 | 9.4 |
| $K_2O$ | 3.3 | 3.3 | 1.3 | 2.0 | 1.4 | 1.7 |
| $Si_2O + Al_2O_3$ | 74.3 | 74.7 | 73.8 | 74.3 | 73.7 | 74.3 |
| $Na_2O + K_2O$ | 13.1 | 13.1 | 13.3 | 13.1 | 11.4 | 11.1 |
| MgO + CaO + SrO + BaO | 12.6 | 12.2 | 12.9 | 12.6 | 14.9 | 14.6 |
| $K_2O/(Na_2O + K_2O)$ | 0.25 | 0.25 | 0.10 | 0.15 | 0.12 | 0.15 |
| $0.13(Si_2O + Al_2O_3) - 9.4$ | 0.259 | 0.311 | 0.194 | 0.259 | 0.181 | 0.259 |
| $0.13(Si_2O + Al_2O_3 + 0.5B_2O_3 + 0.3BaO) - 9.4$ | 0.259 | 0.311 | 0.194 | 0.259 | 0.181 | 0.259 |
| Average thermal expansion coefficient [×$10^{-7}$/° C.] | (82) 84 | (82) 84 | (82) 82 | (82) 82 | 74 | (75) 74 |
| Tg [° C.] | (628) 602 | (628) 605 | (608) 577 | (624) 596 | 604 | (637) 630 |
| Density [g/cm$^3$] | (2.40) | (2.39) | (2.40) | (2.40) | 2.46 | (2.41) |
| $T_2$ [° C.] | (1679) 1655 | (1688) | (1631) 1601 | (1666) | 1629 | (1674) |
| $T_4$ [° C.] | (1218) 1208 | (1222) | (1173) 1137 | (1206) | 1188 | (1221) |
| β-OH Value [mm$^{-1}$] | 0.37 | 0.38 | 0.38 | 0.38 | 0.38 | 0.38 |
| Compaction (C) [ppm] | 15 | 13 | 15 | 16 | 15 | 16 |

TABLE 5

|  | Ex. 25 | Ex. 26 | Ex. 27 | Ex. 28 | Ex. 29 |
|---|---|---|---|---|---|
| $SiO_2$ | 71.4 | 70.5 | 69.6 | 70.0 | 70.6 |
| $Al_2O_3$ | 1.1 | 5.1 | 5.2 | 5.2 | 3.2 |
| $B_2O_3$ | 0.0 | 0.0 | 0.0 | 0.0 | 0.0 |
| MgO | 15.8 | 11.4 | 12.2 | 11.8 | 12.9 |
| CaO | 0.0 | 0.0 | 0.0 | 0.0 | 0.0 |
| SrO | 0.0 | 0.0 | 0.0 | 0.0 | 0.0 |

TABLE 5-continued

|  | Ex. 25 | Ex. 26 | Ex. 27 | Ex. 28 | Ex. 29 |
|---|---|---|---|---|---|
| BaO | 0.0 | 0.0 | 0.0 | 0.0 | 0.0 |
| $ZrO_2$ | 0.0 | 0.0 | 0.0 | 0.0 | 0.0 |
| $Na_2O$ | 10.8 | 6.5 | 6.5 | 6.5 | 10.0 |
| $K_2O$ | 0.9 | 6.5 | 6.5 | 6.5 | 3.3 |
| $Si_2O + Al_2O_3$ | 72.5 | 75.6 | 75.6 | 75.2 | 73.8 |
| $Na_2O + K_2O$ | 11.7 | 13.0 | 13.0 | 13.0 | 13.3 |
| $MgO + CaO + SrO + BaO$ | 15.8 | 11.4 | 12.2 | 11.8 | 12.9 |
| $K_2O/(Na_2O + K_2O)$ | 0.08 | 0.50 | 0.50 | 0.50 | 0.25 |
| $0.13(Si_2O + Al_2O_3) - 9.4$ | 0.025 | 0.428 | 0.324 | 0.376 | 0.194 |
| $0.13(Si_2O + Al_2O_3 + 0.5B_2O_3 + 0.3BaO) - 9.4$ | 0.025 | 0.428 | 0.324 | 0.376 | 0.194 |
| Average thermal expansion coefficient [$\times 10^{-7}$/° C.] | 77 | (86) 85 | (85) 89 | (84) | (83) 82 |
| Tg [° C.] | 603 | (639) | (638) 622 | (639) | (614) |
| Density [g/cm$^3$] | 2.42 | (2.36) | (2.38) | (2.37) | (2.39) |
| $T_2$ [° C.] | 1593 | (1738) 1714 | (1720) | (1729) | (1651) |
| $T_4$ [° C.] | 1150 | (1320) | (1251) | (1255) | (1190) |
| β-OH Value [mm$^{-1}$] | 0.37 | 0.37 | 0.36 | 0.38 | 0.37 |
| Compaction (C) [ppm] | 32 | 17 | 17 | 23 | 23 |

TABLE 6

|  | Ex. 30 | Ex. 31 | Ex. 32 | Ex. 33 | Ex. 34 | Ex. 35 |
|---|---|---|---|---|---|---|
| $SiO_2$ | 68.5 | 68.5 | 70.3 | 70 | 70.3 | 70 |
| $Al_2O_3$ | 3.1 | 3.1 | 3.1 | 3.1 | 3.1 | 3.1 |
| $B_2O_3$ | 2.9 | 0 | 0 | 0 | 0 | 0 |
| MgO | 12.5 | 12.5 | 12.8 | 12.7 | 12.8 | 12.7 |
| CaO | 0 | 0 | 0.5 | 1.0 | 0 | 0 |
| SrO | 0 | 0 | 0 | 0 | 0.5 | 1.0 |
| BaO | 0 | 2.9 | 0 | 0 | 0 | 0 |
| $ZrO_2$ | 0 | 0 | 0 | 0 | 0 | 0 |
| $Na_2O$ | 13.0 | 13.0 | 13.3 | 13.2 | 13.3 | 13.2 |
| $K_2O$ | 0 | 0 | 0 | 0 | 0 | 0 |
| $Si_2O + Al_2O_3$ | 71.6 | 71.6 | 73.4 | 73.1 | 73.4 | 73.1 |
| $Na_2O + K_2O$ | 13.0 | 13.0 | 13.3 | 13.2 | 13.3 | 13.2 |
| $MgO + CaO + SrO + BaO$ | 12.5 | 15.4 | 13.3 | 13.7 | 13.3 | 13.7 |
| $K_2O/(Na_2O + K_2O)$ | 0 | 0 | 0 | 0 | 0 | 0 |
| $0.13(Si_2O + Al_2O_3) - 9.4$ | −0.092 | −0.092 | 0.142 | 0.103 | 0.142 | 0.103 |
| $0.13(Si_2O + Al_2O_3 + 0.5B_2O_3 + 0.3BaO) - 9.4$ | 0.096 | 0.021 | 0.142 | 0.103 | 0.142 | 0.103 |
| Average thermal expansion coefficient [$\times 10^{-7}$/° C.] | 80 | 82 | (80) | (80) | (80) | (80) |
| Tg [° C.] | 579 | 569 | (581) | (581) | (580) | (580) |
| Density [g/cm$^3$] | 2.44 | 2.49 | (2.43) | (2.43) | (2.43) | (2.43) |
| $T_2$ [° C.] | 1556 | 1566 | (1616) | (1614) | (1616) | (1614) |
| $T_4$ [° C.] | 1107 | 1101 | (1160) | (1159) | (1160) | (1159) |
| β-OH Value [mm$^{-1}$] | 0.38 | 0.36 | 0.36 | 0.37 | 0.38 | 0.37 |
| Compaction (C) [ppm] | 14 | 15 | (13) | (15) | (14) | (16) |

As apparent from the Tables, in the glasses of Inventive Examples (Examples 1 to 24 and 30 to 35), the compaction (C) is 16 ppm or less, so that when used as a glass plate for a TFT panel, heat shrinkage of the glass plate can be suppressed at the heat treatment in a low temperature region in the production process of a TFT panel.

Furthermore, the density is 2.50 g/cm$^3$ or less, so that the glass can be suitably used as a glass plate for a lightweight TFT panel.

Also, the average thermal expansion coefficient at 50 to 350° C. is 85×10$^{-7}$/° C. or less, so that when used as a glass plate for a TFT panel, dimensional change in the production process of a TFT panel can be suppressed.

On the other hand, in the glasses of Comparative Examples (Examples 25 to 29), the compaction (C) is as large as 17 ppm or more, and this may affect heat shrinkage at a low temperature in the production process of a TFT panel.

Production Example of the glass plate for a substrate of the present invention is described below.

Raw materials for respective components are blended to give the composition shown in Table 1, and the raw materials are continuously charged into a melting furnace and melted at a temperature of 1,550 to 1,650° C. Here, the water amount in the molten glass is controlled so that the glass plate for a substrate to be produced can have a β-OH value (mm$^{-1}$) of 0.05 to 0.5, preferably from 0.2 to 0.5.

The molten glass is continuously formed into a ribbon-shaped glass plate by a float process, then withdrawn from the float furnace when the surface temperature of the glass plate reaches the transition temperature Tg+20° C., and cooled in a cooling furnace at an average cooling rate of 40 to 60° C./min until the surface temperature of the glass plate becomes room temperature ($T_L$=25° C.). Thereafter, the glass plate is cut into a predetermined dimension (2 m or more on a side). A glass plate for a substrate of the present invention having a compaction (C) of 16 ppm is obtained.

In the case where $SO_3$ is used as a refining agent in the glass melting step of the present invention, a glass with excellent fining effect and a small number of bubbles is obtained.

The glass plate for a substrate of the present invention can be suitably used as a glass substrate particularly for a large-size (2 m or more on a side) TFT panel.

Production Example of a TFT panel of the present invention is described below.

In the production process of an array substrate, the glass plate for a substrate of the present invention is cleaned, and a gate electrode and a wiring pattern are formed thereon.

The glass plate is then held at a film deposition temperature of 250° C. for 15 minutes, and a gate insulating film is deposited by CVD method.

Subsequently, an a-Si film is deposited, a channel protective film is deposited, and a pattern is formed by patterning.

Also, an N+-type a-Si film, a pixel electrode and a contact pattern are formed.

Furthermore, source/drain electrode is formed, and a protective film is then deposited to obtain a TFT array substrate. Thereafter, a TFT panel is obtained through the following known steps.

That is, a TFT panel can be produced through a series of steps comprising an alignment treatment step of forming an alignment film on each of the array substrate and a color filter substrate and performing rubbing, a step of laminating together the TFT array substrate and the color filter substrate with high accuracy while keeping a predetermined gap therebetween, a dividing step of dividing the substrate into cells with a predetermined size, an injection step of injecting a liquid crystal into the divided cell, and a polarizing plate lamination step of laminating a polarizing plate to the cell.

Since the glass plate for a substrate of the present invention has a compaction (C) of 16 ppm or less, even when used for such a production method of a TFT panel, heat shrinkage is small and distortion of the deposition pattern hardly occurs.

While the present invention has been described in detail and with reference to specific embodiments thereof, it will be apparent to one skilled in the art that various changes and modifications can be made therein without departing from the spirit and scope of the present invention.

This application is based on Japanese Patent Application No. 2009-240204 filed on Oct. 19, 2009, the contents of which are incorporated herein by way of reference.

INDUSTRIAL APPLICABILITY

The glass plate for a substrate of the present invention is suitable as a glass substrate for a liquid crystal display (LCD) panel and can be used as a substrate for other displays such as plasma display panel (PDP) and inorganic or organic electroluminescence display.

The invention claimed is:

1. A glass plate for a substrate, comprising, as a glass matrix composition, in mol % on a basis of oxide moles:
   $SiO_2$ from 67 to 72,
   $Al_2O_3$ from 1 to 7,
   $B_2O_3$ from 0 to 4,
   MgO from 11 to 15,
   CaO from 0 to 3,
   SrO from 0 to 3,
   BaO from 0 to 4,
   $ZrO_2$ from 0 to 4,
   $Na_2O$ from 8 to 15, and
   $K_2O$ from 0 to 7,
   wherein
   $SiO_2+Al_2O_3$ is from 71 to 75.2,
   MgO+CaO+SrO+BaO is from 11 to 17,
   $Na_2O+K_2O$ is from 8 to 17, and
   $K_2O/(Na_2O+K_2O) \leq 0.13 \times (SiO_2+Al_2O_3+0.5B_2O_3+0.3BaO)-9.4$ is satisfied, and
   wherein
   the glass plate has a β-OH value ($mm^{-1}$) of from 0.05 to 0.5, and
   a heat shrinkage ratio (C) of 16 ppm or less.

2. A glass plate for a substrate, comprising, as a glass matrix composition, in mol % on a basis of oxide moles:
   $SiO_2$ from 67 to 72,
   $Al_2O_3$ from 1 to 7,
   $B_2O_3$ from 0 to 4,
   MgO from 11 to 15,
   CaO from 0 to 3,
   SrO from 0 to 3,
   BaO from 0 to 2,
   $ZrO_2$ from 0 to 4,
   $Na_2O$ from 8 to 15, and
   $K_2O$ from 0 to 7,
   wherein
   $SiO_2+Al_2O_3$ is from 73 to 77,
   MgO+CaO+SrO+BaO is from 11 to 17,
   $Na_2O+K_2O$ is from 8 to 17, and
   $K_2O/(Na_2O+K_2O) \leq 0.13 \times (SiO_2+Al_2O_3)-9.4$ is satisfied, and
   wherein
   the glass plate has the β-OH value ($mm^{-1}$) of from 0.05 to 0.5, and
   the heat shrinkage ratio (C) of 16 ppm or less.

3. The glass plate for a substrate according to claim 1, wherein
   an average thermal expansion coefficient of the glass plate at 50 to 350° C. is $85 \times 10^{-7}/°$ C. or less,
   a glass transition temperature (Tg) of the glass plate is 560° C. or more,
   a temperature $T_2$ at which a viscosity of the glass of the glass plate becomes $10^2$ dPa·s is 1,700° C. or less, and
   a temperature $T_4$ at which the viscosity of the glass of the glass plate becomes $10^4$ dPa·s is 1,250° C. or less.

4. The glass plate for a substrate according to claim 1, wherein the β-OH value ($mm^{-1}$) is from 0.2 to 0.5.

5. The glass plate for a substrate according to claim 1, wherein,
   the content of $SiO_2$ is from 67 to 70.5, and
   the content of $Na_2O$ is from 8 to 12.8.

6. A method to produce the glass plate for a substrate of claim 1, comprising:
   melting the glass raw material composition to obtain a molten glass;
   forming the molten glass into a ribbon-shaped glass plate in a float forming furnace; and
   cooling the glass plate to obtain the glass plate for a substrate
   in a room temperature state, wherein
   a water amount in the molten glass is controlled such that the β-OH value ($mm^{-1}$) of the glass plate for a substrate is from 0.05 to 0.5, and
   when a surface temperature of the glass plate withdrawn from the float forming furnace is cooled from a temperature $T_H$ (° C.) to room temperature $T_L$ (° C.), and a time required for the surface temperature of the glass plate to reach $T_L$ from $T_H$ with said cooling is set to t (min) at an average cooling rate represented by $(T_H-T_L)/t$ of 10 to 300° C./min.

7. The production method of claim 6 wherein
the water amount in the molten glass is controlled such that the β-OH value (mm$^{-1}$) of the glass plate for a substrate is from 0.2 to 0.5.

8. A method for producing a TFT panel, comprising:
depositing an array substrate gate insulating film on a surface of a glass plate for a substrate;
laminating together the array substrate and a color filter substrate; wherein
the film deposition comprises heating the film deposition region on a surface of the glass plate for a substrate according to claim 1 to a film deposition temperature within the range of from 150 to 300° C., holding the film deposition region at the film deposition temperature for 5 to 60 minutes, and depositing the gate insulating film in the film deposition region.

* * * * *